United States Patent
Tagaya (10) Patent No.: US 10,834,299 B2
(45) Date of Patent: Nov. 10, 2020

(54) ELECTRONIC APPARATUS

(71) Applicant: CANON KABUSHIKI KAISHA, Tokyo (JP)

(72) Inventor: Akira Tagaya, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 44 days.

(21) Appl. No.: 15/981,565

(22) Filed: May 16, 2018

(65) Prior Publication Data

US 2018/0338075 A1 Nov. 22, 2018

(30) Foreign Application Priority Data

May 18, 2017 (JP) .................................. 2017-099065
Feb. 23, 2018 (JP) .................................. 2018-030504

(51) Int. Cl.
| | |
|---|---|
| *H04N 5/225* | (2006.01) |
| *H04R 1/08* | (2006.01) |
| *H04N 7/18* | (2006.01) |
| *G03B 31/00* | (2006.01) |
| *G03B 17/08* | (2006.01) |
| *G06F 1/16* | (2006.01) |

(52) U.S. Cl.
CPC ........... *H04N 5/2254* (2013.01); *G03B 17/08* (2013.01); *G03B 31/00* (2013.01); *H04N 5/2256* (2013.01); *H04N 7/18* (2013.01); *H04R 1/083* (2013.01); *G06F 1/1605* (2013.01)

(58) Field of Classification Search
CPC .... H04N 5/2254; H04N 5/2256; G03B 17/08; G03B 31/00; G06F 1/1605
See application file for complete search history.

(56) References Cited

U.S. PATENT DOCUMENTS

| | | | |
|---|---|---|---|
| 8,971,552 B2* | 3/2015 | Momose | H04R 3/00 381/122 |
| 9,469,469 B2 | 10/2016 | Rayner | |
| 10,401,715 B2* | 9/2019 | Watanabe | H04N 5/2252 |
| 2005/0179813 A1* | 8/2005 | Fujii | H04N 5/2252 348/375 |
| 2006/0139443 A1* | 6/2006 | Tatamiya | H04N 5/2252 348/14.02 |
| 2012/0195451 A1 | 8/2012 | Nakata et al. | |
| 2014/0078708 A1* | 3/2014 | Song | H04N 1/00519 361/809 |

(Continued)

FOREIGN PATENT DOCUMENTS

| | | |
|---|---|---|
| CN | 1438817 A | 8/2003 |
| CN | 1658061 A | 8/2005 |
| CN | 1690834 A | 11/2005 |

(Continued)

*Primary Examiner* — Nidhi Thaker
(74) *Attorney, Agent, or Firm* — Canon U.S.A., Inc. IP Division (57) ABSTRACT

An electronic apparatus includes a housing in which an opening is formed, a microphone disposed inside the housing and configured to collect sound from the opening, a light emitter disposed inside the housing and configured to emit light from the opening, and a buffer member configured to block the opening. The buffer member has a base portion, a first portion facing the microphone, and a second portion facing the light emitter. The first portion is a cut portion of the base portion. The second portion is a portion protruding from the base portion.

23 Claims, 9 Drawing Sheets (56) References Cited

U.S. PATENT DOCUMENTS

2017/0104901 A1* 4/2017 Sanford ............... H04N 5/2256

FOREIGN PATENT DOCUMENTS

| | | | |
|---|---|---|---|
| CN | 101393480 | A | 3/2009 |
| CN | 103416043 | A | 11/2013 |
| CN | 203734963 | U | 7/2014 |
| CN | 104427224 | A | 3/2015 |
| JP | 2006154175 | A * | 6/2006 |
| JP | 2006154175 | A | 6/2006 |
| JP | 2014143674 | A | 8/2014 |
| JP | 2015-216217 | A | 12/2015 |

* cited by examiner

ELECTRONIC APPARATUS

BACKGROUND OF THE INVENTION

Field of the Invention

The present invention relates to a waterproof-dustproof structure of an electronic apparatus equipped with a microphone and a light emitter.

Description of the Related Art

Digital cameras and monitoring cameras of recent years have a built-in microphone for recording sound. In some cases, a waterproof-dustproof structure is employed for the microphone in consideration of outdoor use. For example, as discussed in Japanese Patent Application Laid-Open No. 2014-143674, there is a waterproof-dustproof structure provided for a microphone to block an opening of a housing by using a waterproof filter with no air permeability. Further, a dedicated microphone holding member is used to prevent transmission of vibration noise to the microphone.

Further, there is a camera structure provided with a light emitting unit for emitting light to the outside to indicate a power supply status or a recording status of the camera. The light emitting unit is covered with a dedicated translucent member to diffuse light and ensure waterproofing. For example, a light emitting unit discussed in Japanese Patent Application Laid-Open No. 2015-216217 diffuses light by using a window member having translucency. In addition, waterproofing-dustproofing performance is ensured by bonding a flange portion of the window member to a housing.

A waterproof-dustproof structure such as those discussed in Japanese Patent Application Laid-Open No. 2014-143674 and Japanese Patent Application Laid-Open No. 2015-216217 may be applied to a digital camera or monitoring camera having both of a microphone and a light emitting unit. In either case, however, a dedicated waterproof-dustproof component is used and thus, the number of components increases. This leads to an increase in the size of the apparatus main body of the digital camera or monitoring camera, which is a problem.

SUMMARY OF THE INVENTION

The present invention relates to an electronic apparatus having waterproof-dustproof structure for a microphone and a light emitter, without increasing the size of an apparatus main body.

According to an aspect of the present invention, an electronic apparatus includes a housing having an opening, a microphone disposed inside the housing and configured to receive sound from the opening, a light emitter disposed inside the housing and configured to emit light through the opening, and a first member configured to block the opening, wherein the first member has a base portion, a first portion facing the microphone, and a second portion facing the light emitter, wherein the first portion is a recessed portion of the base portion, and wherein the second portion is a portion protruding from the base portion.

Further features of the present invention will become apparent from the following description of exemplary embodiments with reference to the attached drawings.

DESCRIPTION OF THE EMBODIMENTS

Figure 1:
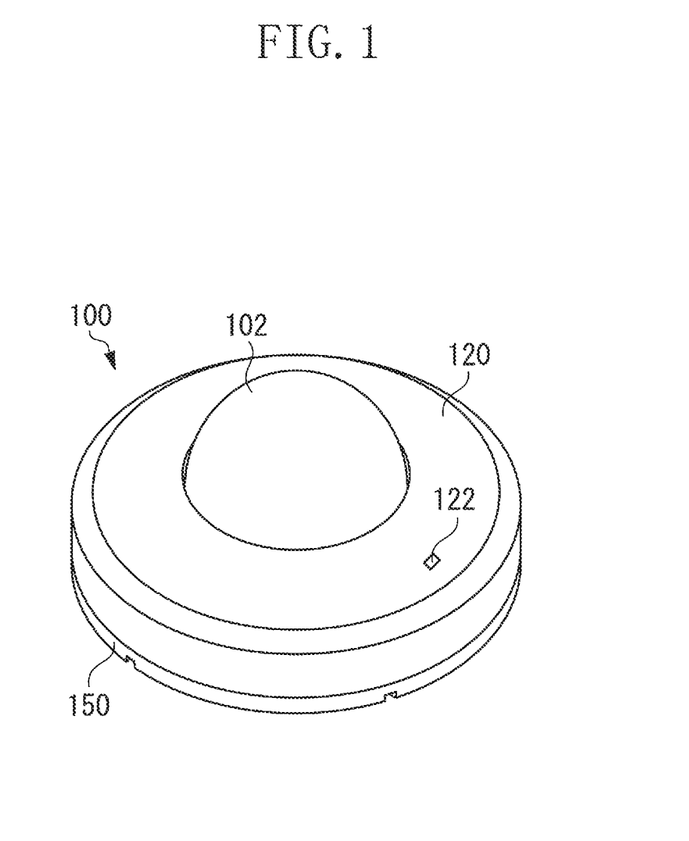
FIG. 1 is a perspective view illustrating an external appearance of a monitoring camera according to a first exemplary embodiment of the present invention.
Figure 2:
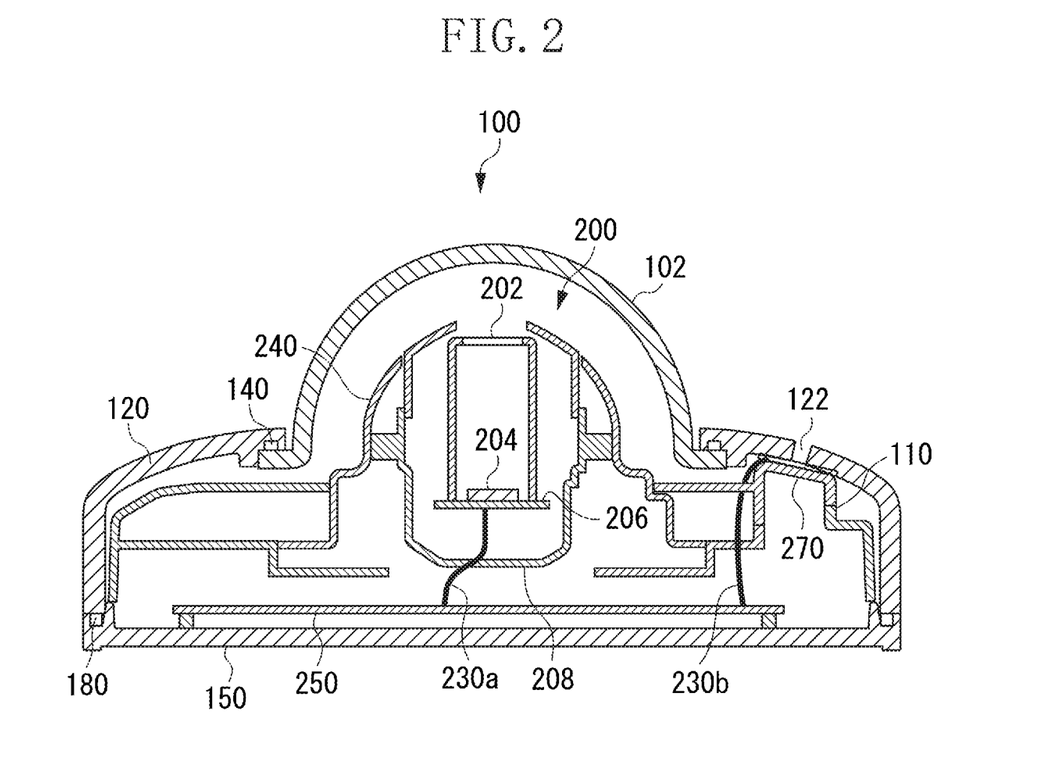
FIG. 2 is a cross-sectional diagram illustrating a schematic configuration of the monitoring camera according to the first exemplary embodiment of the present invention.

A first exemplary embodiment of the present invention will be described below with reference to the drawings. FIG. 1 is a perspective view illustrating an external appearance of a monitoring camera according to the first exemplary embodiment of the present invention. FIG. 2 is a cross-sectional diagram illustrating a schematic configuration of the monitoring camera according to the first exemplary embodiment of the present invention.

A monitoring camera 100 serving as an example of an electronic apparatus is capable of capturing and recording an image and recording sound. The monitoring camera 100 includes a lens protection member 102, and a housing comprising an upper case 120 and a bottom case 150.

The lens protection member 102 protects a component provided inside the housing. The lens protection member 102 is formed of, for example, transparent polycarbonate. The lens protection member 102 is fixed to the upper case 120, with an O-ring 140 interposed therebetween, as illustrated in FIG. 2.

An opening 122 for receiving sound to be recorded is formed in the upper case 120. It will be appreciated that air, sound, and light may pass between the inside and the outside of the housing via the opening. The upper case 120 and the bottom case 150 can each be manufactured by using, for example, metal die-casting, or resin molding of a material such as polycarbonate. The upper case 120 and the bottom case 150 are fastened to each other with a screw, with a packing 180 interposed therebetween. This prevents water and dust from entering the housing. The packing 180 is formed of, for example, silicon or a urethane foam material.

The housing contains a camera unit 200. The camera unit 200 includes a lens 202, an imaging device 204, a sensor substrate 206, and a camera casing 208. Further, the housing contains a camera unit holding member 240, a substrate holding member 110, a control substrate 250, and a microphone substrate 270. The microphone substrate serves as an example of a substrate. Furthermore, the housing contains a buffer member 300 serving as an example of a first member. The housing also contains a microphone 350 and a light emitter 360 (see FIG. 3).

The camera unit 200 converts light received through the lens protection member 102 and the lens 202 into an electrical signal, by using the imaging device 204. The imaging device 204 is electrically connected to the control substrate 250 by a wire 230a, and transmits acquired imaging data to the control substrate 250. The camera unit holding member 240 holds the camera unit 200. The substrate holding member 110 holds the microphone substrate 270. The substrate holding member 110 can be manufactured by using, for example, resin molding of a material such as polycarbonate.

The control substrate 250 has functions for controlling the entire monitoring camera 100, such as power supply, camera control, and connection to a network. The control substrate 250 is fixed to the bottom case 150 by a fixing member such as a screw.

Figure 3:
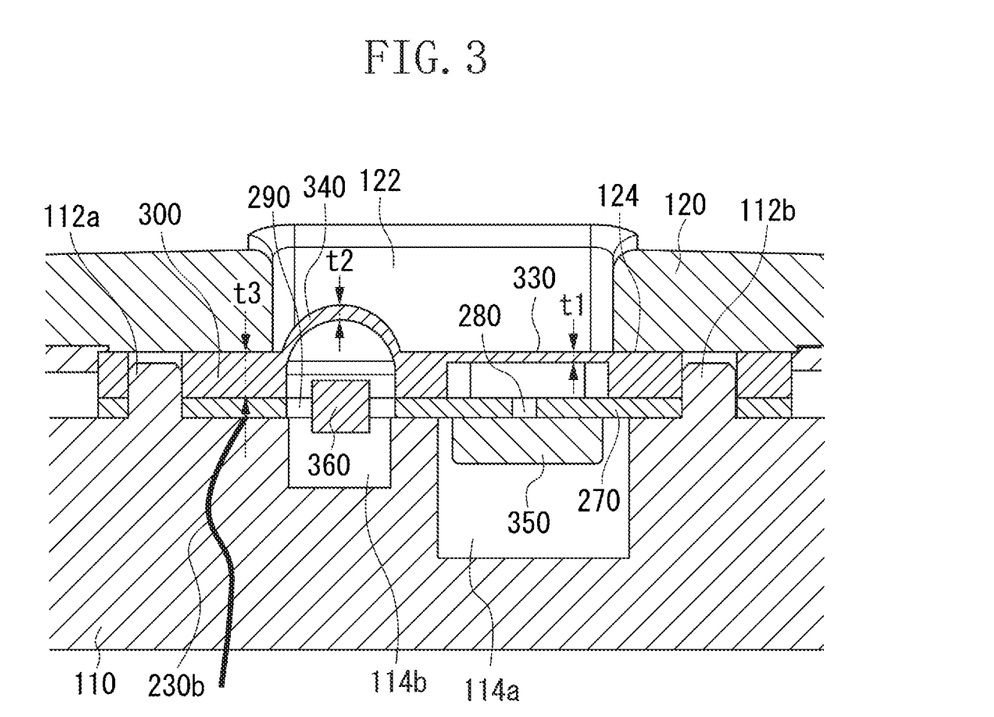
FIG. 3 is a cross-sectional diagram illustrating a detailed configuration of a vicinity of a microphone and a light emitter according to the first exemplary embodiment of the present invention.

The microphone 350 is a sound component for converting sound into an electrical signal. The microphone 350 receives sound passing through the opening 122 and the buffer member 300. The microphone 350 has a membrane (not illustrated) provided inside thereof. The membrane may be vibrated by pressure from the received sound. The microphone 350 converts vibrations in the membrane into an electrical signal.

The light emitter 360 emits light and may for example be a light emitting diode (LED). The emitted light may pass through the buffer member 300 and out of the opening 122. In this way, light from the light emitter 360 may exit the housing. The light emitter 360 may emit light to indicate a status of the monitoring camera 100 such as a power supply status or a recording status of the camera for a user.

Next, a structure in the region of the microphone 350 and the light emitter 360 will be described with reference to FIG. 3. FIG. 3 is a cross-sectional diagram illustrating a detailed configuration of the vicinity of the microphone 350 and the light emitter 360 according to the present exemplary embodiment.

The substrate holding member 110 has protrusions 112a and 112b, as illustrated in FIG. 3. The protrusions 112a, 112b preferably have a substantially cylindrical shape. The protrusions 112a and 112b are arranged to be inserted into a through-hole formed in the microphone substrate 270 and a through-hole formed in the buffer member 300. Inserting the protrusions 112a, 112b into the through-holes fixes the positions of the microphone substrate 270 and the buffer member 300. The substrate holding member 110 has a first space 114a (e.g. a trench or other type or recess) for accommodating the microphone 350, and a second space 114b (e.g. a trench or other type or recess) for accommodating the light emitter 360.

The microphone substrate 270 may be fixed onto the substrate holding member 110 with a member such as a screw, tape or other attachment means. The buffer member 300 is held between the microphone substrate 270 and an undersurface 124 of the upper case 120.

The microphone 350 and the light emitter 360 are preferably disposed on the same surface (opposite surface with respect to the buffer member 300) of the microphone substrate 270. For example, the microphone 250 and the light emitter 360 may be disposed on a side of the microphone substrate 270 that faces away from the opening 122—e.g. they may be disposed on a side of the microphone substrate 270 that faces away from the buffer member 300 and towards the substrate holding member 110. A microphone hole 280 may be formed in the microphone substrate 270 at a position where the microphone 350 is disposed—e.g. the microphone hole 280 may be positioned adjacent to the microphone 350. A light emitter hole 290 may be formed in the microphone substrate 270 at a position where the light emitter 360 is disposed—e.g. the light emitter hole 290 may be formed adjacent to the light emitter 360. The microphone substrate 270 is electrically connected to the control substrate 250 by a member such as a wire 230b.

Figure 4:
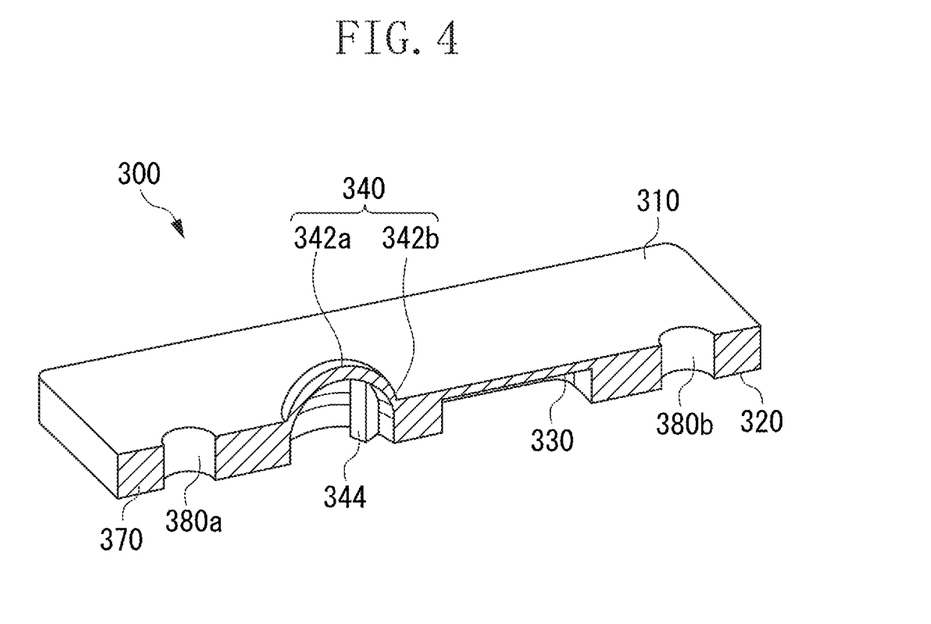
FIG. 4 is a cross-sectional perspective view of a buffer member according to the first exemplary embodiment of the present invention.

Next, the buffer member 300 will be described in detail. FIG. 4 is a cross-sectional perspective view of the buffer member 300.

The buffer member 300 may be a substantially rectangular elastic member such as a silicon rubber member. The buffer member 300 improves a signal-to-noise ratio (S/N) of the microphone 350 by reducing vibration noise from the outside of the housing. For example, the positioning of the buffer member 300 has been found to improve the S/N. The elastic properties of the buffer member 300 has also been found to improve the S/N. In addition, the depth of the buffer member 300 has been found to improve the S/N. The buffer member 300 is preferably disposed between the housing and the microphone substrate 270 and is arranged to block the opening 122. The buffer member 300 has a first surface 310 and a second surface 320. The first surface 310 and the second surface 320 face opposite directions. The first surface 310 faces the opening 122 and is preferably positioned in contact with the undersurface 124 of the upper case 120. The first surface 310 preferably blocks (e.g. seals) the opening 122, and thereby prevents entering of water and dust from the outside of the housing. The second surface 320 is positioned to contact the microphone substrate 270.

The buffer member 300 has positioning holes 380a and 380b (see FIG. 4). The positioning holes 380a, 380b are ideally positioned outside the area of the opening 122—e.g. the positioning holes 380a, 380b may be placed at a location which is to side of the opening 122. The protrusions 112a and 112b of the substrate holding member 110 are inserted into these holes to fix the position of the buffer member 300, as described above. The protrusions may be inserted into the holes 380a, 380b from the second surface 320 side of the buffer member 300. This can prevent misalignment of the positions of the microphone 350 and the light emitter 360 relative to the buffer member 300, and can thereby ensure appropriate sound collection performance and visibility of a light emitting unit.

The buffer member 300 also has a first portion 330 facing the microphone 350, a second portion 340 facing the light emitter 360, and a third portion 370 serving as a base portion. The third portion 370 is preferably a planar portion. The second portion 340 is preferably a portion that protrudes from the third portion 370. The first portion 330 is preferably a thin portion that is relatively thinner than the third portion 370. The first portion 330 may be provided by defining a cut in the third portion 370—e.g. the first portion may be defined by a trench or other type of recess in the third portion 370. The first portion 330 may have a thickness of t1, the second portion 340 may have a thickness of t2, and the third portion 370 may have a thickness (basic wall thickness) of t3, wherein the relation between the thicknesses is given by $t1 \leq t2 < t3$. The first portion 330 is desirably the thinnest portion for propagation of sound. The second portion 340 is desired to be thinner than the thickness (basic wall thickness) of the third portion 370 in order to allow penetration and diffusion of light. The third portion 370 is configured to be the thickest portion in order to reduce the vibration noise. For example, t1=2 mm, t2=3 mm, and t3 is 100 mm.

The first portion 330 is preferably formed on the first surface 310 side of the buffer member 300 (i.e. the first portion 330 is preferably a part of the first surface 310). Sound waves from the opening 122 may propagate through the first portion 330 to the microphone 350. Further, because the first portion 330 has no air permeability, water and dust do not pass therethrough.

The second portion 340 has substantially hemispherical shape, and is formed on the first surface 310 side of the buffer member 300. Because the second portion 340 has no air permeability, water and dust do not pass therethrough. However, the second portion 340 is thin (e.g., t2=3 mm) and thus has translucency (e.g., desirably 80% or more). Therefore, the second portion 340 diffuses light emitted from the light emitter 360 disposed on the second surface 320 side of the buffer member 300. Further, the second portion 340 has a zenith portion 342a and a foot portion 342b, and becomes thicker in a direction from the foot portion 342b to the zenith portion 342a. In other words, the thickness increases in a direction toward the outside of the housing, or rather the thickness increases towards the center of the hemisphere.

For example, in a case where the light emitter 360 is configured of an LED, as light travels straight, it is conceivable that light in the zenith portion 342a may have a strong intensity whereas light in the foot portion 342b may have weak intensity. Hence, there is a possibility of non-uniform diffusion of light, which impairs visibility and external appearance. In the present exemplary embodiment, the zenith portion 342a has a large wall thickness and thus has low translucency, and the foot portion 342b has a small wall thickness and thus has high translucency. Accordingly, the diffusion of light can be uniform, and the visibility and the appearance can be improved.

The second portion 340 further has a reinforcement rib 344, as illustrated in FIG. 4. The reinforcement rib 344 protrudes from an inner surface of the second portion 340 toward the inside. It will be appreciated that the inner surface of the second portion faces away from the first surface 310 of the buffer member 300, or in other words the inner surface of the second portion faces away from the opening 122. The reinforcement rib 344 prevents the second portion 340 from being deformed by a force such as a jet flow from the outside of the housing.

As described above, according to the first exemplary embodiment of the present invention, a single member can achieve waterproof-dustproof of the microphone 350 and the light emitter 360. This can reduce the number of components. Therefore, it is possible to achieve waterproofing and dustproofing of the microphone 350 and the light emitter 360, without increasing the size of the apparatus main body. In addition, the wall thickness of the second portion 340 increases in the direction from the foot portion 342b to the zenith portion 342a. Accordingly, the light of the light emitter 360 can be uniformly diffused.

A second exemplary embodiment of the present invention will be described below. In the second exemplary embodiment of the present invention, the shape of a buffer member and the shape of a substrate holding member are different from those of the monitoring camera 100 according to the first exemplary embodiment of the present invention described above.

Figure 5:
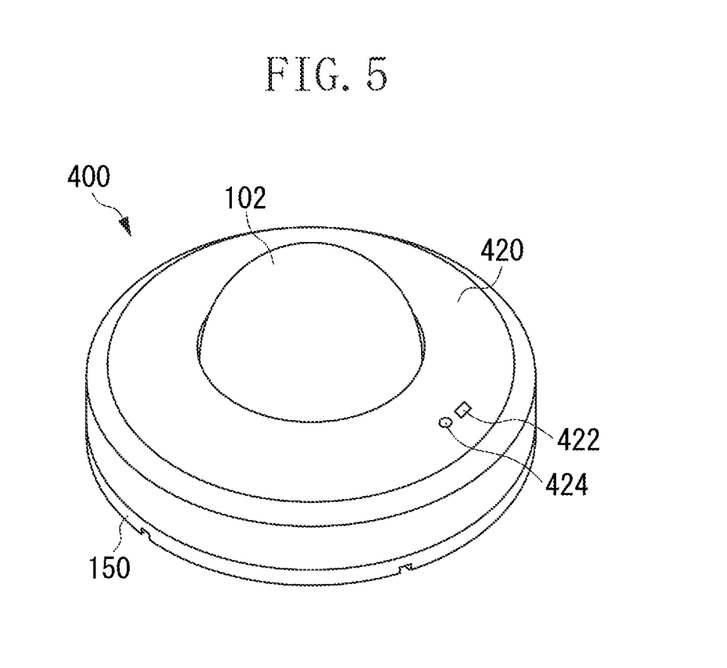
FIG. 5 is a perspective view illustrating an external appearance of a monitoring camera according to a second exemplary embodiment of the present invention.

The points different from those of the first exemplary embodiment of the present invention will be mainly described below, and the same configurations as those of the first exemplary embodiment will not be described. FIG. 5 is a perspective view illustrating an appearance of a monitoring camera according to the second exemplary embodiment of the present invention.

A monitoring camera 400 is capable of capturing and recording an image and recording sound. The monitoring camera 400 includes a housing configured of an upper case 420 and a bottom case 150.

An opening in the second exemplary embodiment is divided into a sound aperture 422 for a microphone 350 and a light emission hole 424 for a light emitter 360. The sound aperture 422 and the light emission hole 424 are formed in the upper case 420. The sound aperture 422 formed in the upper case 420 allows air and sound to pass therethrough between the inside and the outside of the housing. The light emission hole 424 allows light to pass therethrough between the inside and the outside of the housing. The upper case 420 can be fabricated by using, for example, metal die-casting, or resin molding of a material such as polycarbonate.

Figure 6:
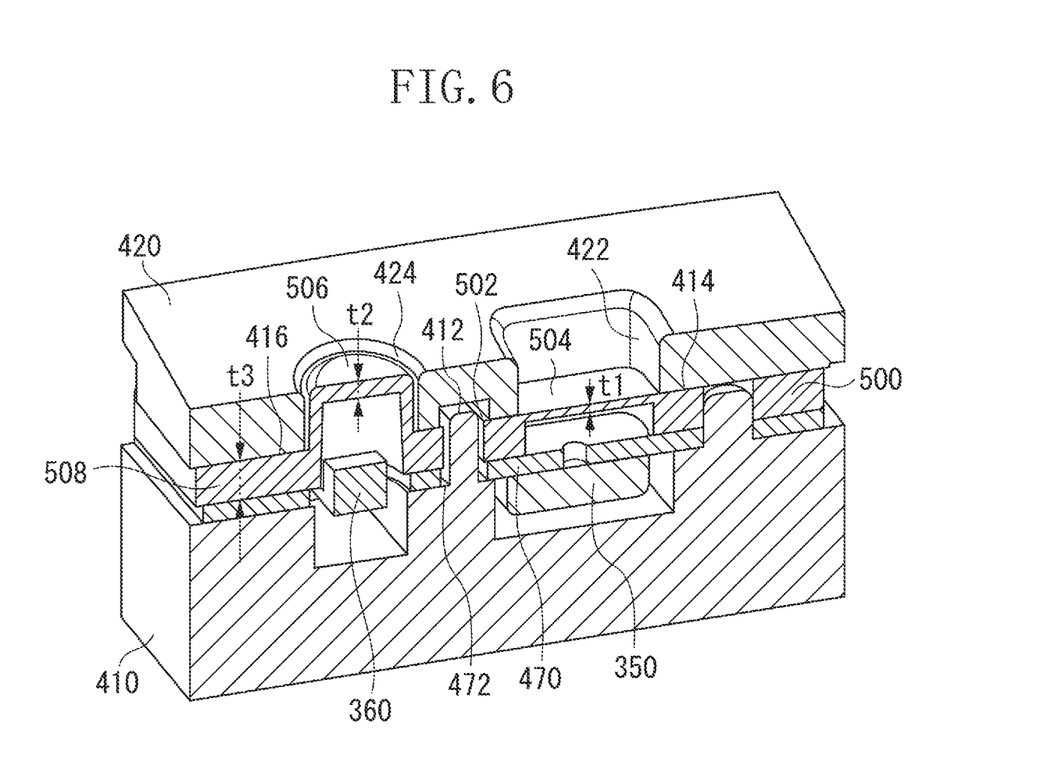
FIG. 6 is a cross-sectional perspective view illustrating a detailed configuration of a vicinity of a microphone and a light emitter according to the second exemplary embodiment of the present invention.

FIG. 6 is a cross-sectional perspective view illustrating a detailed configuration of the monitoring camera 400 according to the second exemplary embodiment of the present invention.

A substrate holding member 410 has a light blocking wall 412 to separate the microphone 350 and the light emitter 360. The light blocking wall 412 may have a substantially rectangular cross-section. The light blocking wall 412 preferably has a leading end that is chamfered to pass through other component easily. The substrate holding member 410 can be fabricated by resin molding using a material such as polycarbonate. It is desirable to fabricate the substrate holding member 410 in a color having almost no translucency. The translucency of the substrate holding member 410 is desirably 0.1% or less, and the color is desirably blackish.

The microphone 350 and the light emitter 360 are preferably disposed on the back face of a microphone substrate 470—i.e. on the face of the microphone substrate that faces away from the opening in the housing. The microphone substrate 470 has a slit 472 formed between the microphone 350 and the light emitter 360. The light blocking wall 412 is inserted into the slit 472. The microphone substrate 470 may be fixed to the substrate holding member 410 with a member such as a screw, tape or other fixing means.

Figure 7:
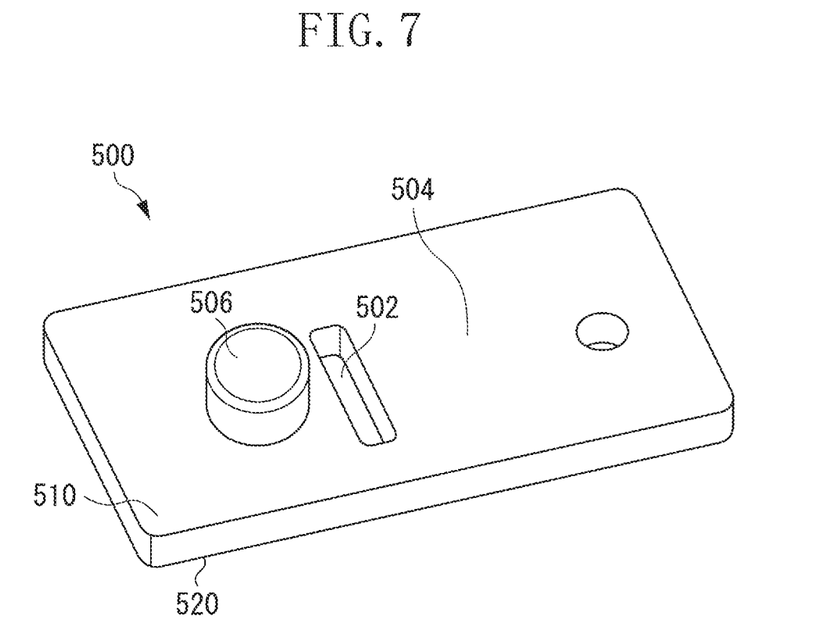
FIG. 7 is an overall perspective view of a buffer member according to the second exemplary embodiment of the present invention.

Next, a buffer member 500 will be described in detail. FIG. 7 is an overall perspective view of the buffer member 500 according to the second exemplary embodiment of the present invention. The buffer member 500 is preferably formed of a substantially rectangular elastic member such as silicon rubber. The buffer member 500 improves S/N of the microphone 350 by reducing vibration noise from the outside of the housing. Further, the buffer member 500 has a first surface 510 and a second surface 520. Like the first embodiment, the first surface 510 and the second surface 520 face in opposite directions. The first surface 510 is preferably positioned to face and contact a sound aperture portion undersurface 414 and a light emission aperture portion undersurface 416 of the upper case 420. The contact between the first surface 510 and the upper case 420 ideally seals the openings (i.e. the sound aperture 422 and the light emission hole 424) in the upper case 420. In this way, water and dust is prevented from entering the housing through the sound aperture 422 and the light emission hole 424. The second surface 520 is preferably positioned to face and contact the microphone substrate 470.

The buffer member 500 further has a first portion 504, a second portion 506, and a third portion 508. The first portion 504 is formed on the first surface 510 side to propagate sound wave vibration collected from the sound aperture 422 to the microphone 350. The second portion 506 is formed on the first surface 510 side. Light emitted from the light emitter 360 may pass through the second portion 506 and out through the light emission hole 424. The emitted light may notify a user of a power or recording status of the monitoring camera 400. The second portion 506 may be cylindrical, and may have a height that allows the second portion 506 to be located close to the external surface of the upper case 420 when it is disposed in the light emission hole 424. Further, as in the first exemplary embodiment, the first portion 504 may have a thickness of t1, the second portion 506 may have a thickness of t2, and the third portion 508 may have a thickness (a basic wall thickness) of t3, wherein the relationship between the thicknesses is given by $t1 \leq t2 < t3$.

The buffer member 500 further has a light blocking wall slit 502 between the first portion 504 and the second portion 506. The light blocking wall slit 502 is rectangular, and the light blocking wall 412 of the substrate holding member 410 passes therethrough.

As described above, the light blocking wall 412 is provided in the substrate holding member 410. Therefore, the light emitted from the light emitter 360 is blocked by the light blocking wall 412, and thereby leakage of light from the sound aperture 422 can be suppressed. Hence, visibility for a user and external appearance can be improved. In addition, the light blocking wall 412 can fix the position of each of the microphone substrate 470 and the buffer member 500. In this way, the light locking wall 412 provides at least two beneficial effects.

Moreover, as in the first exemplary embodiment, a single member can achieve waterproofing and dustproofing of the microphone 350 and the light emitter 360. Therefore, it is possible to achieve waterproofing and dustproofing of the microphone 350 and the light emitter 360, without increasing the size of the apparatus main body.

A third exemplary embodiment of the present invention will be described below. In the third exemplary embodiment of the present invention, the shape of each of a buffer member and a substrate holding member, and a way of holding a microphone are different, as compared with the microphone holding structure according to the first exemplary embodiment of the present invention described above.

The points different from those in the first exemplary embodiment of the present invention will be mainly described below, and the same configurations as those in the first exemplary embodiment will not be described.

Figure 8:
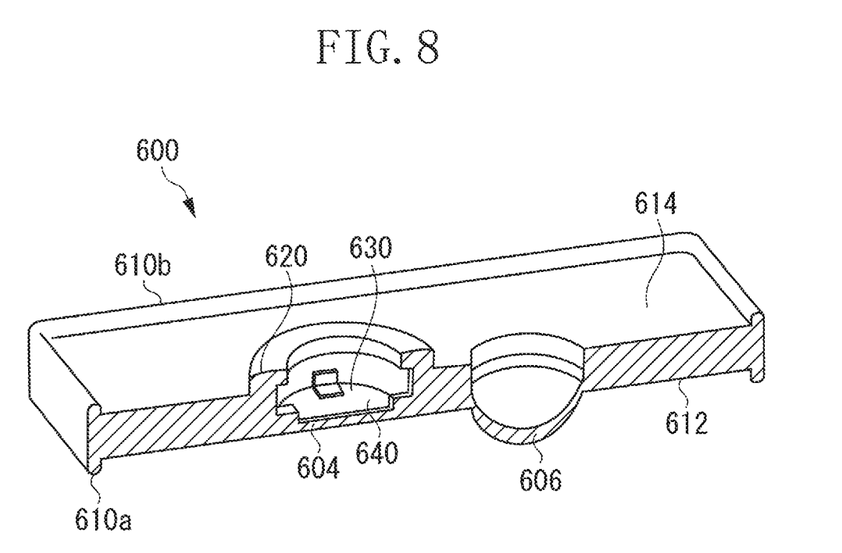
FIG. 8 is a cross-sectional perspective view of a buffer member according to a third exemplary embodiment of the present invention.

FIG. 8 is a cross-sectional perspective view of a buffer member according to the third exemplary embodiment of the present invention.

A buffer member 600 is preferably formed of a substantially rectangular elastic member such as silicon rubber to absorb noise, and therefore, improves S/N in sound collection by reducing vibration noise from the inside and the outside of a housing. The buffer member 600 has buffering ribs 610a and 610b, a first surface 612, and a second surface 614. Like the first embodiment, the first surface 612 and the second surface 614 face opposite directions. The buffering ribs 610a and 610b are formed at the outer surface of the buffer member 600—e.g. the buffering ribs 610a and 610b may be positioned along the perimeter of the buffer member 600 and may extend from the first surface 612 and the second surface 614. The buffer member 600 further has a microphone holding portion 620 which may be substantially shaped like a ring. Further, a support portion 630 and an undercut portion 640 are formed inside the ring.

Figure 9:
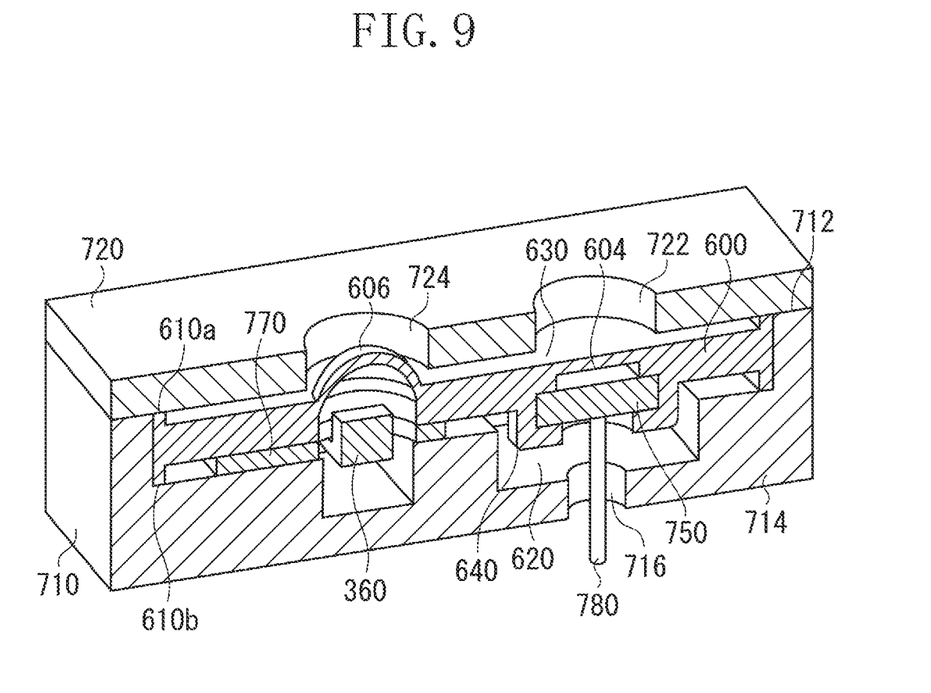
FIG. 9 is a cross-sectional perspective view illustrating a detailed configuration of a vicinity of a microphone and a light emitter according to the third exemplary embodiment of the present invention.

FIG. 9 is a cross-sectional perspective view of a detailed configuration of the vicinity of a microphone and a light emitter according to the third exemplary embodiment of the present invention.

A sound aperture 722 and a light emission hole 724 are formed in an upper case 720. The sound aperture 722 allows air and sound to pass therethrough between the inside and the outside of the housing. The light emission hole 724 allows light to pass therethrough between the inside and the outside of the housing. A light emitter 360 is mounted on a light emitter substrate 770 and is fixed to a substrate holding member 710 by a member such as a screw or other fixing means. The substrate holding member 710 may have a guide wall 712 located at opposing ends of the substrate holding member 710. The buffer member 600 may be positioned between the guide walls 712 and ideally contacts the guide walls 712. In this way, the guide walls guide the buffer member 600 into position and can be used to regulate the position of the buffer member 600. The substrate holding member 710 further has a microphone storage portion 714 and a wire hole 716. A microphone 750 is held by the microphone holding portion 620 formed in the buffer member 600. The microphone 750 is electrically connected to a control substrate (not illustrated) by a microphone wire 780 passing through the wire hole 716.

The buffer member 600 is held by other members with the buffering ribs 610a and 610b interposed therebetween. The buffering rib 610a on the upper side (i.e. the rib 610a which extends from the first surface 612) contacts the upper case 720, and the buffering rib 610b on the lower side (i.e. the rib 610a which extends from the second surface 614) contacts the substrate holding member 710. The contact between the ribs 610a, 610b and the upper case 720 and the substrate holding member 710 forms a seal which prevents a substance such as water from entering the housing through the sound aperture 722 and the light emission hole 724. The buffering ribs 610a and 610b may each be formed of a thin rib (desirably the thickness thereof is 0.5 mm or more and equal to or less than the half of base thickness (t3)), and each of portions of the buffering ribs 610a and 610b (leading ends of the ribs) that contact the other members has a substantially semicircular shape. Therefore, each of portions of the buffering ribs 610a and 610b that contact the other members 720 has smaller area than that when each of the portions (leading ends of the ribs) is a surface. Hence, an area of contact between members is small, and the rigidity of the buffering ribs 610a and 610b in itself is low. As a result, vibration in the inside and shock from the outside of the housing are reduced, and thereby waterproofing performance is improved. Moreover, the position thereof is easily regulated by the guide wall 712, because the buffering ribs 610a and 610b are formed along the outer surface of the buffer member 600—e.g. the buffering ribs 610a, 610b may contact and form a seal with the guide walls 712. In consideration of shock absorbency and assembly, the buffering ribs 610a and 610b may be additionally provided at a portion other than the outer surface of the buffer member 600. In such a case, the buffering rib may be formed of a plurality of hemispheres or cylindrical shapes, without being limited to the thin rib shape.

A first thin wall portion 604 of the buffer member allows propagates sound wave vibration collected from the sound aperture 722 to the microphone 750—e.g. like in the first and second embodiments, the first thin wall portion may vibrate in response to the sound waves entering from the sound aperture 722, and in this way the first thin wall portion 604 may propagate the sound waves to the microphone 750. A second thin wall portion 606 allows light emitted from the light emitter 360 to pass therethrough and can thereby notify a user of a power or recording status of a camera. The microphone holding portion 620 encloses and holds the microphone 750 by using the support portion 630 and the undercut portion 640 formed inside. The support portion 630 forms a sound collection space between the microphone 750 and the first thin wall portion 604, and serves to reduce an area of contact with the microphone 750. The undercut portion 640 (see FIG. 3) has a hole at the center, and the microphone wire 780 passes through this hole. This hole also serves as a hole for inserting the microphone 750 into the buffer member 600. As the microphone 750 is thus supported, it is possible to prevent vibration noise in the inside and the outside of the housing from being collected, and to protect the microphone 750 from external shock. To prevent propagation of vibration to the microphone wire 780, a wire holding member may be formed in the undercut portion 640 or the wire hole 716. Moreover, the undercut portion 640 may have a shape for further reducing the area of the contact with the microphone 750.

In the exemplary embodiments described above, the housing is configured of two components, but may be configured of three or more components. Further, in the exemplary embodiments described above, the lens protection member 102 is spherical, but may be non-spherical or planar. Furthermore, in the exemplary embodiments described above, the packing 180 and the O-ring 140 are used each as a component for waterproofing and dustproofing of the housing, but a waterproofing dustproofing process may be performed using a double-faced tape, or a substance such as an adhesive or a sealant.

In the exemplary embodiments described above, the lens protection member 102 may be fixed using a screw or other component. Moreover, a waterproof structure may be ensured and fixed by bonding the upper case 120 and the lens protection member 102 together by a process such as ultrasonic welding.

In the exemplary embodiments described above, the control substrate 250 is a single substrate, but a configuration including a plurality of substrates such as one for power management use and another for camera control, may be adopted. Further, in the exemplary embodiments described above, the microphone substrate 270 may be directly connected to the control substrate 250 by using a flexible substrate, without using the wire 230b.

In the exemplary embodiments described above, the microphone 350 and the light emitter 360 are disposed on the back face of the microphone substrate 270, but may be disposed on the front face. Moreover, in the exemplary embodiments described above, the microphone 350 and the light emitter 360 are each formed of a single component, but in other examples a plurality of components may be used to provide stereo sound collection or a plurality of light emission colors.

In the exemplary embodiments described above, the buffer members 300 and 500 are each formed of silicon rubber, but may be formed of other elastic materials such as diene rubber or thermoplastic elastomer.

In the exemplary embodiments described above, a thin rib shape may be formed at a portion contacting the undersurface 124 of the buffer member 300 in order to improve waterproofing and dustproofing reliability. Moreover, the opening 122 may be blocked with a substance such as a tape material or adhesive provided between the buffer member 300 and the undersurface 124.

In the exemplary embodiments described above, the positioning holes 380a and 380b as well as the protrusions 112a and 112b of the substrate holding member 110 are used to fix the position of the buffer member 300. However, the external form of the buffer member 300 may be used, or a jig for fixing the position may be used.

While the present invention has been described with reference to exemplary embodiments, it is to be understood that the invention is not limited to the disclosed exemplary embodiments.

This application claims the benefit of Japanese Patent Application No. 2017-099065, filed May 18, 2017, which is hereby incorporated by reference herein in its entirety.

This application also claims the benefit of Japanese Patent Application No. 2018-030504, filed Feb. 23, 2018.

What is claimed is:

1. An electronic apparatus comprising:
a housing having an opening;
a microphone disposed inside the housing and configured to receive sound from the opening;
a light emitter disposed inside the housing and configured to emit light through the opening;
a substrate configured to be electrically connected to the microphone and the light emitter;
a support member disposed inside the housing and configured to support the substrate; and
a first member disposed between the housing and the substrate and configured to block the opening,
wherein the first member has a base portion, a first portion facing the microphone, and a second portion facing the light emitter,
wherein the first portion is a recessed portion of the base portion,
wherein the second portion is a portion protruding from the base portion, and
wherein the first member has at least one engagement portion which engages with the support member.

2. The electronic apparatus according to claim 1, wherein the first portion has a thickness of t1, the second portion has a thickness of t2, and the base portion has a thickness of t3, and whereby $t1 \leq t2 < t3$.

3. The electronic apparatus according to claim 1, wherein the second portion is formed to be substantially hemispheric, and the thickness of the second portion increases toward the center of the hemisphere.

4. The electronic apparatus according to claim 1, wherein at least one reinforcement rib is formed either inside of the first portion or inside of the second portion.

5. The electronic apparatus according to claim 1, wherein the support member has a light blocking wall disposed between the microphone and the light emitter.

6. The electronic apparatus according to claim 5, wherein the first member has a slit which is formed between the first portion and the second portion, and wherein the slit is configured to receive the light blocking wall.

7. The electronic apparatus according to claim 1, wherein the microphone and the light emitter are disposed on a same surface of the substrate.

8. The electronic apparatus according to claim 1, wherein the microphone and the light emitter are disposed on a side of the substrate which faces away from the first member.

9. The electronic apparatus according to claim 1, wherein the opening includes a sound aperture for the microphone and a light emission hole for the light emitter.

10. The electronic apparatus according to claim 1, wherein the housing has a lens for capturing an image, and an imaging device.

11. The electronic apparatus according to claim 1,
wherein the support member has at least one protrusion,
wherein the engagement portion is a through-hole, and
wherein the protrusion is inserted into the through-hole.

12. The electronic apparatus according to claim 1,
wherein the support member has at least one protrusion,
wherein the substrate has a through-hole, and
wherein the protrusion is inserted into the through-hole.

13. An electronic apparatus comprising:
a housing having an opening;
a microphone disposed inside the housing and configured to receive sound from the opening;
a light emitter disposed inside the housing and configured to emit light through the opening;
a substrate configured to be electrically connected to the microphone and the light emitter;
a support member disposed inside the housing and configured to support the substrate; and
a first member disposed between the housing and the substrate and configured to block the opening,
wherein the first member has a first portion facing the microphone, a second portion facing the light emitter, and a third portion, and
wherein the first portion, the second portion, and the third portion are different in thickness,
wherein the first member has at least one engagement portion which engages with the support member.

14. The electronic apparatus according to claim 13, wherein the third portion is a planar portion, the second portion is a portion protruding from the third portion, and the first portion is a recessed portion of the third portion.

15. The electronic apparatus according to claim 13, wherein the first portion has a thickness of t1, the second portion has a thickness of t2, and the third portion has a thickness of t3, and whereby $t1 \leq t2 < t3$.

16. The electronic apparatus according to claim 13, wherein the second portion is formed to be substantially hemispheric, and the thickness of the second portion increases toward the center of the hemisphere.

17. The electronic apparatus according to claim 13, wherein at least one reinforcement rib is formed either inside of the first portion or inside of the second portion.

18. The electronic apparatus according to claim 13, wherein the support member has a light blocking wall disposed between the microphone and the light emitter.

19. The electronic apparatus according to claim 18, wherein the first member has a slit which is formed between the first portion and the second portion, and wherein the slit is configured to receive the light blocking wall.

20. The electronic apparatus according to claim 13, wherein the microphone and the light emitter are disposed on a same surface of the substrate.

21. The electronic apparatus according to claim 13, wherein the microphone and the light emitter are disposed on a side of the substrate which faces away from the first member.

22. The electronic apparatus according to claim 13,
wherein the support member has at least one protrusion,
wherein the engagement portion is a through-hole, and
wherein the protrusion is inserted into the through-hole.

23. The electronic apparatus according to claim 13,
wherein the support member has at least one protrusion,
wherein the substrate has a through-hole, and
wherein the protrusion is inserted into the through-hole.

* * * * *